United States Patent
Teng

(10) Patent No.: US 8,649,769 B2
(45) Date of Patent: Feb. 11, 2014

(54) METHOD AND DEVICE FOR DETECTING WHETHER MISSED CALL IS EFFECTIVE

(75) Inventor: Fei Teng, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/500,911

(22) PCT Filed: Sep. 15, 2010

(86) PCT No.: PCT/CN2010/076930
§ 371 (c)(1),
(2), (4) Date: Apr. 8, 2012

(87) PCT Pub. No.: WO2011/047584
PCT Pub. Date: Apr. 28, 2011

(65) Prior Publication Data
US 2012/0208505 A1    Aug. 16, 2012

(30) Foreign Application Priority Data
Oct. 19, 2009 (CN) .......................... 2009 1 0180855

(51) Int. Cl.
*H04M 3/16* (2006.01)
*H04M 3/42* (2006.01)

(52) U.S. Cl.
USPC ........................................ 455/411; 455/414.1

(58) Field of Classification Search
USPC ............... 455/411–412, 466, 414.1; 370/350, 370/352, 389
See application file for complete search history.

(56) References Cited

U.S. PATENT DOCUMENTS 5,953,638 A * 9/1999 Flood et al. ................... 340/7.29
7,979,054 B2 * 7/2011 Baysinger ..................... 455/411

FOREIGN PATENT DOCUMENTS

| CN | 1921700 A | 2/2007 |
| CN | 101426185 A | 5/2009 |
| CN | 101505465 A | 8/2009 |
| CN | 101674557 A | 3/2010 |
| EP | 1069791 A1 | 1/2001 |
| EP | 2099204 A1 | 9/2009 |
| JP | 2007129506 A | 5/2007 |

OTHER PUBLICATIONS

International Search Report for PCT/CN2010/076930 dated Dec. 3, 2010.

* cited by examiner

*Primary Examiner* — Charles N. Appiah
*Assistant Examiner* — Emem Stephen
(74) *Attorney, Agent, or Firm* — Ling Wu; Stephen Yang; Ling and Yang Intellectual Property

(57) ABSTRACT

A method and device for detecting whether a missed call is valid are disclosed in the present invention. Wherein, the method for detecting whether a missed call is valid includes the following steps: when a call is not successfully established, a network side prompting a caller to enter authentication information and sending the authentication information entered by the caller to a called terminal side in a form of a short message; the called terminal side receiving and identifying an authentication short message, judging whether the authentication short message is valid, and authenticating the corresponding incoming call number to be authenticated in a cache by using the authentication information when the authentication short message is judged to be valid; and the called terminal side writing the incoming call number passing the authentication into a missed call record.

4 Claims, 4 Drawing Sheets

| Number to be authenticated | Whether there is authentication content | Authentication mode | Text of the authentication information |
|---|---|---|---|
| The number concerned in this authentication message | 1:There is text 0:There is no text | 1: Surname of the called person 0:Full name of the called person | Initials under the authentication mode |

METHOD AND DEVICE FOR DETECTING WHETHER MISSED CALL IS EFFECTIVE

TECHNICAL FIELD

The present invention relates to the field of mobile communication, and in particular, to a technique for a mobile communication terminal to detect whether a missed call is valid.

BACKGROUND ART

The incoming call display function of the communication devices, such as mobile phone and fixed phone, currently used by people only simply records all incoming but not answered calls, and does not make any distinction. However, with the development of the technology and change of the social environment, such function cannot fully meet people's demand any longer.

In the current stage, the utilization ratio and popularization ratio of mobile phone have rapidly increased, which are followed by the problems occurring during the process of application. For example, people will be usually confused: the mobile phone often has some missed calls due to various reasons, and among these missed calls, some are valid missed calls to which the owner needs to reply, for example calls of his colleagues, friends and clients; while some missed calls are malicious harassing calls, which are invalid calls to which people do not need to pay attention, and some features of these missed calls are that the incoming call calls in until the network side waits overtime and prompts that there is no answer for the call, and this case may be caused by wrong dialing of the caller, or by harassing calls which are intended to be hung up immediately after connection; some other features are that the incoming call is hung up before connection to induce the owner to reply, and the owner may find after reply that they are numbers that the owner are unwilling to call such as numbers transferred to an information service center, and numbers for black advertisement, fake certificates and cheating numbers, thus causing losses of the owner in various aspects including property and emotion. If the owner reply to none of the above missed calls, then the owner may have losses in aspects such as career, work and family love; on the contrary, he may fall into the trap of malicious and harassing calls and thus gets into a dilemma. This is an issue currently disturbing the large number of mobile terminal users, and is also a problem that has not been solved yet in the related art.

Chinese patent application 200610031156.1 discloses a technique enabling communicating devices to distinguish good-will incoming calls from malicious ones. In the technical scheme of the patent, the ringing time of the incoming call is counted, and the result is compared with a set judging standard time, thereby distinguishing good-will incoming calls from malicious ones, i.e., distinguishing invalid incoming calls from valid ones, consequently. However, since this patent adopts a manner of passive detection, the calls cannot be distinguished completely.

SUMMARY OF THE INVENTION

The present invention provides a method and device for detecting whether a missed call is valid, so as to solve the problem in the related art that validity of missed calls cannot be distinguished accurately.

A network side server according to the present invention, comprises: a prompting module, which is configured to prompt a caller to enter authentication information when a call is not successfully established; a receiving module, which is configured to receive the authentication information entered by the caller; and a sending module, which is configured to send the authentication information to a called terminal in a form of a short message.

Preferably, the network side server further comprises a timing module, which is triggered after the prompting module completes prompting and is configured to determine a valid time when the caller enters the authentication information.

A mobile terminal of the present invention, comprises: an incoming call number temporary storage module, which is configured to store an incoming call number to be authenticated; a receiving module, which is configured to receive a short message sent from a network side; an authentication short message identifying module, which is configured to identify an authentication short message among received short messages, judge whether the authentication short message is valid or not, and send out authentication information in the authentication short message when the authentication short message is judged to be valid; an authenticating module, which is configured to receive the authentication information, and authenticate the corresponding incoming call number in the incoming call number temporary storage module; and a missed call writing module, which is configured to write an incoming call number passing the authentication into a missed call record.

Preferably, the mobile terminal further comprises: a timing module, which is triggered when a number to be authenticated is stored into the incoming call number temporary storage module and is configured to determine a valid time when the authentication short message is received.

Preferably, the authentication short message identifying module is configured to extract the authentication information from the authentication short message, search numbers to be authenticated stored in the incoming call number temporary storage module using a number to be authenticated in the authentication information, and determine that the authentication short message is valid if an identical number to be authenticated is searched out.

A method for detecting whether a missed call is valid according to the present invention comprises:

when a call is not successfully established, a network side prompting a caller to enter authentication information and sending the authentication information entered by the caller to a called terminal side in a form of a short message;

the called terminal side receiving and identifying an authentication short message, judging whether the authentication short message is valid, and authenticating a corresponding incoming call number to be authenticated in a cache by using the authentication information when the authentication short message is judged to be valid; and the called terminal side writing the incoming call number passing the authentication into a missed call record.

Preferably, after the network side prompts the caller to enter the authentication information, the method further comprises: starting a first timer, and determining a valid time when the caller enters the authentication information.

Preferably, the method further comprises: the called terminal side starting a second timer after the incoming call number to be authenticated is cached, and determining a valid time when the authentication short message is received.

Preferably, said step of judging whether the authentication short message is valid comprises: extracting the authentication information from the authentication short message; searching cached numbers to be authenticated using a number to be authenticated in the authentication information; and determining that the authentication short message is valid if an identical number to be authenticated is searched out.

Preferably, after the called terminal side writes the incoming call number passing the authentication into a missed call record, the method further comprises: the called terminal side deleting the incoming call number from the cache; and/or, the called terminal side deleting an incoming call number not passing the authentication from the cache.

The beneficial effects of the present invention are as follows:

through cooperation of the caller, the mobile terminal of the called can actively identify valid missed called from invalid missed calls, thereby enabling the user of the mobile terminal to avoid harassment of invalid calls effectively, and meeting people's requirement on normal communication.

PREFERRED EMBODIMENTS OF THE PRESENT INVENTION

In order to accurately determine whether a missed call is valid, the features of valid calls and those of invalid calls must be correctly described, analyzed and judged. The feature of valid calls is that the caller knows some information of the owner, for example the most basic information such as family name or full name of the owner. The feature of invalid calls is that for either malicious calls or harassing calls, the caller does not know anything about the owner, and he just makes this call with certain purpose or inadvertently.

Based on the study on the above features of valid calls and invalid calls, the main concept of the present invention is to let the caller enter some information of the called owner actively before the call is connected, thereby enabling the called terminal to actively identify whether the last call is a valid missed call, and enabling the user of the mobile terminal to avoid harassment of invalid calls effectively, thus meeting people's requirement on normal communication.

The specific embodiments of the present invention will be described in further detail below with reference to the drawings.

Figure 1:
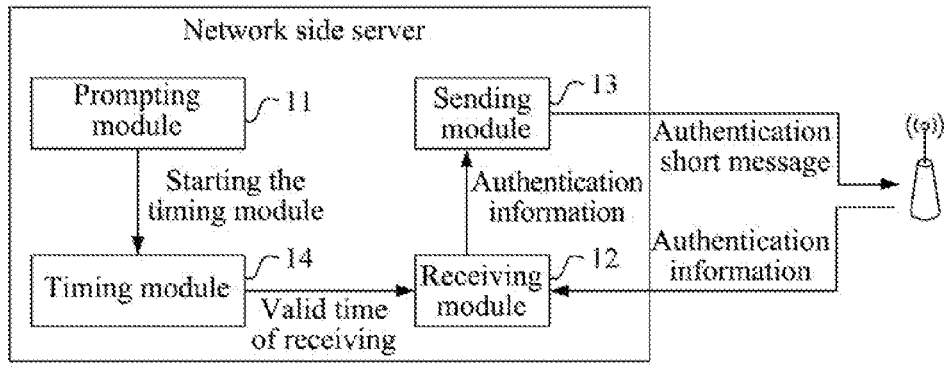
FIG. 1 is a block diagram of detecting a missed call at the network side according to an example of the present invention.

Referring to FIG. 1, the network side server according to an example of the present invention comprises: a prompting module 11, a receiving module 12 and a sending module 13; in order to further optimize the scheme, the network side server may further comprise a timing module 14.

Wherein, the prompting module is configured to prompt the caller in a manner of voice or other manners that the call of this time is not established, but the authentication information needs to be entered so as to add its number into the missed call record of the opposite side (the called party) and meanwhile to prompt with the authentication manner.

The receiving module is configured to receive the authentication information entered by the caller. Here, there are many ways for the network side to receive the authentication information. It may be that the network side prompts to enter the authentication information when the call is not established, and the caller enters the corresponding data after hearing the prompt; however, this way is only limited to the case where the text of the authentication information is figures; or it may be that the network side sends a short message to the terminal of the caller when the call is not established, and the caller replies according to the prompt of the short message; this way may not be limited by the text format of the authentication information, and words and figures are both OK.

The sending module is configured to send the authentication information to the terminal of the called in a form of a short message.

The timing module is configured to start to work after the prompting module completes prompting to define the valid time for the caller to enter the authentication information.

Figure 2:
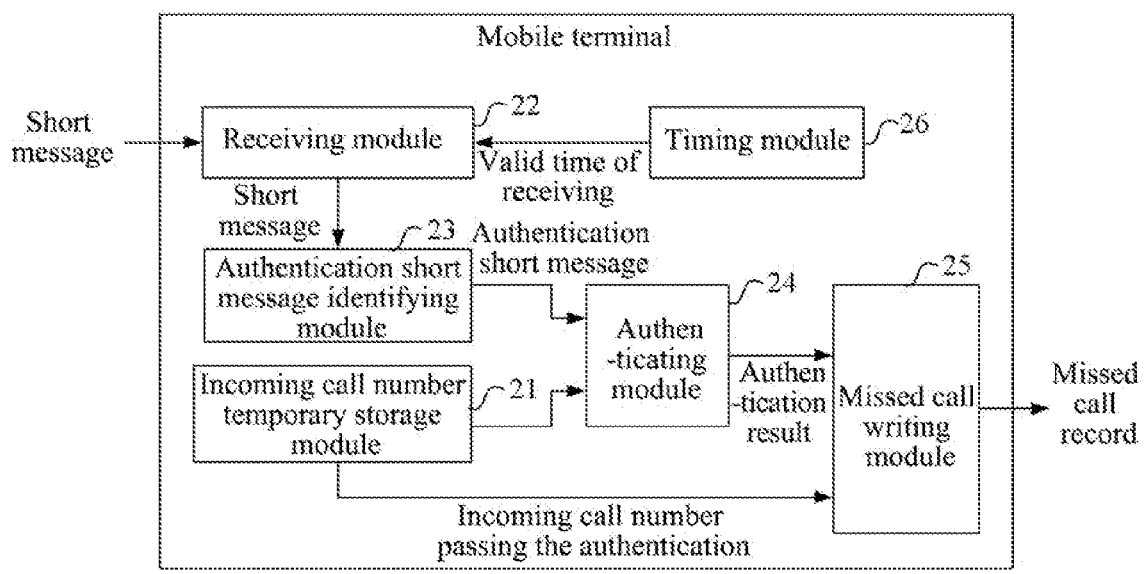
FIG. 2 is a block diagram of detecting a missed call at the terminal side according to an example of the present invention.

Referring to FIG. 2, the mobile terminal according to an example of the present invention comprises an incoming call number temporary storage module 21, a receiving module 22, an authentication short message identifying module 23, an authenticating module 24 and a missed call writing module 25; in order to further optimize the scheme, it may further comprise a timing module 26.

Wherein, the incoming call number temporary storage module is configured to store an incoming call number to be authenticated.

The receiving module is configured to receive the authentication information sent from a network side.

The authentication short message identifying module is configured to differentiate between types of the received short messages, and if the short message is an authentication short message, extract the authentication information in the message, search the incoming call number temporary storage module to find whether there is the number to be authenticated in the authentication information, if there is, judge that the authentication short message is valid, and send out the authentication information therein, otherwise judge that the authentication short message is invalid.

The authenticating module is configured to receive the authentication information sent from the authentication short message identifying module, and authenticate the corresponding incoming call number in the incoming call number temporary storage module.

The missed call writing module is configured to write an incoming call number passing the authentication into a missed call record, otherwise, delete the corresponding number in the incoming call number temporary storage module.

The timing module is configured to define the valid time of receiving the authentication short message to prevent the incoming call number in the incoming call number temporary storage module from being always in a to-be-authenticated state when the network side has a fault.

The method for detecting whether a missed call is valid according to an example of the present invention will be described in detail below through the following authentication information format, a flow of the network side detecting a missed call, a flow of the terminal side detecting a missed call and a flow of authentication algorithm.

Figures 3, 4:
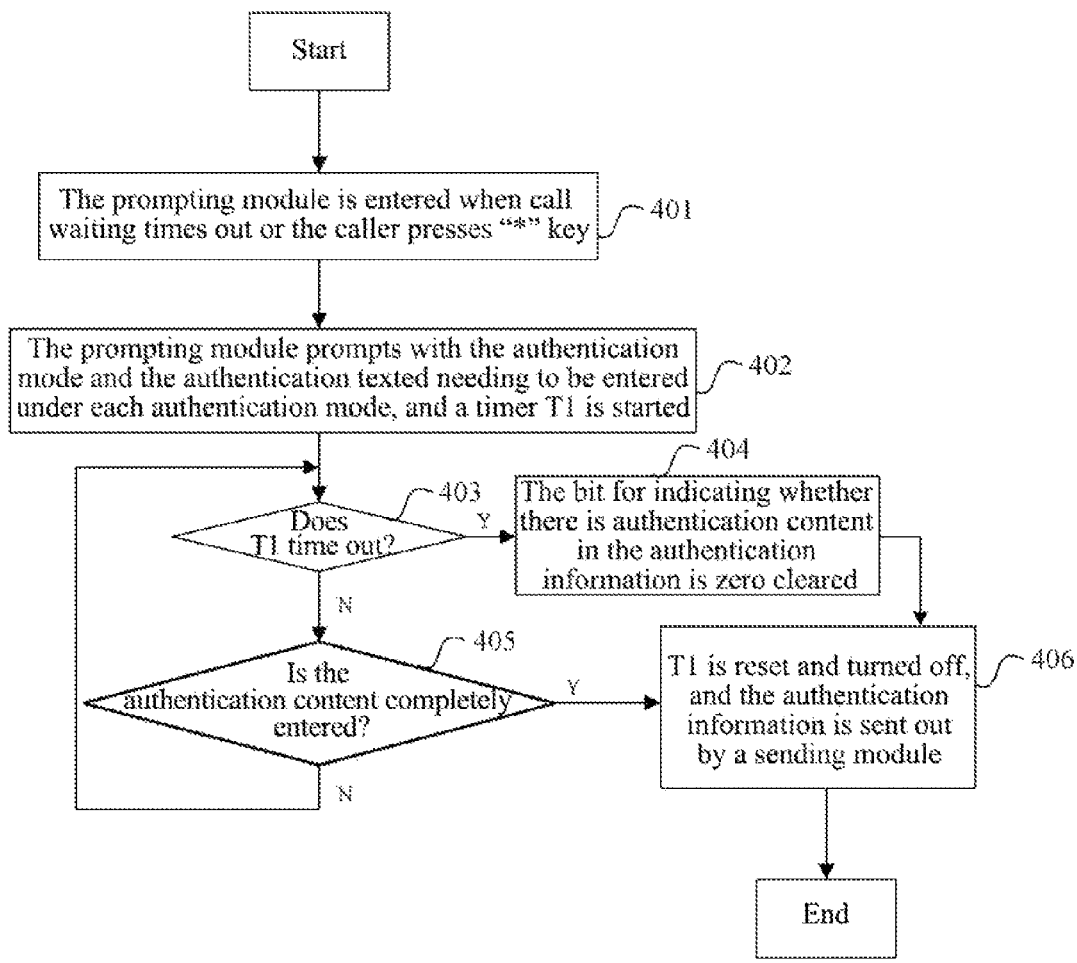
FIG. 3 illustrates the format of the authentication information according to an example of the present invention.
FIG. 4 is a flowchart of detecting a missed call at the network side according to an example of the present invention.

Referring to FIG. 3, the authentication information is mainly composed of a number to be authenticated, a flag bit for indicating whether authentication content exists, authentication mode and a text of the authentication information.

Wherein, the number to be authenticated stores the number of the missed call corresponding to the authentication information; the flag bit for indicating whether authentication content exists indicates whether there is a valid authentication mode and text to be authenticated; the authentication mode represents the specific mode for authentication, for example, the surname, full name or other information of the called owner; the text of the authentication information is the specific content to be authenticated.

Referring to FIG. 4, the flow of the network side detecting the missed call comprises the following specific steps.

In step 401, the prompting module of the network side is triggered when call waiting times out or the caller triggers presses some particular keys (for example, "*", "#").

In step 402, the prompting module of the network side prompts that this call fails, but some authentication information (for example, the surname, initials of the full name of the called owner) needs to be entered so as to store its call number into a missed call record of the opposite party. Meanwhile, the called is hung up, and a timer T1 (for example 30 s) is started.

In step 403, whether T1 times out is judged, and if yes, step 404 is executed; otherwise step 405 is executed.

In step 404, the bit for indicating whether there is authentication content in the authentication information to be sent is zero cleared; turning to step 406;

if T1 times out, it is indicated that the authentication content is not complete.

In step 405, whether the authentication content is completely entered is judged, and if yes, step 406 is executed, otherwise, turning to step 403.

In step 406, the authentication information is forwarded by a sending module to the called terminal in a form of a short message. Meanwhile, T1 is reset and turned off.

Figure 5:
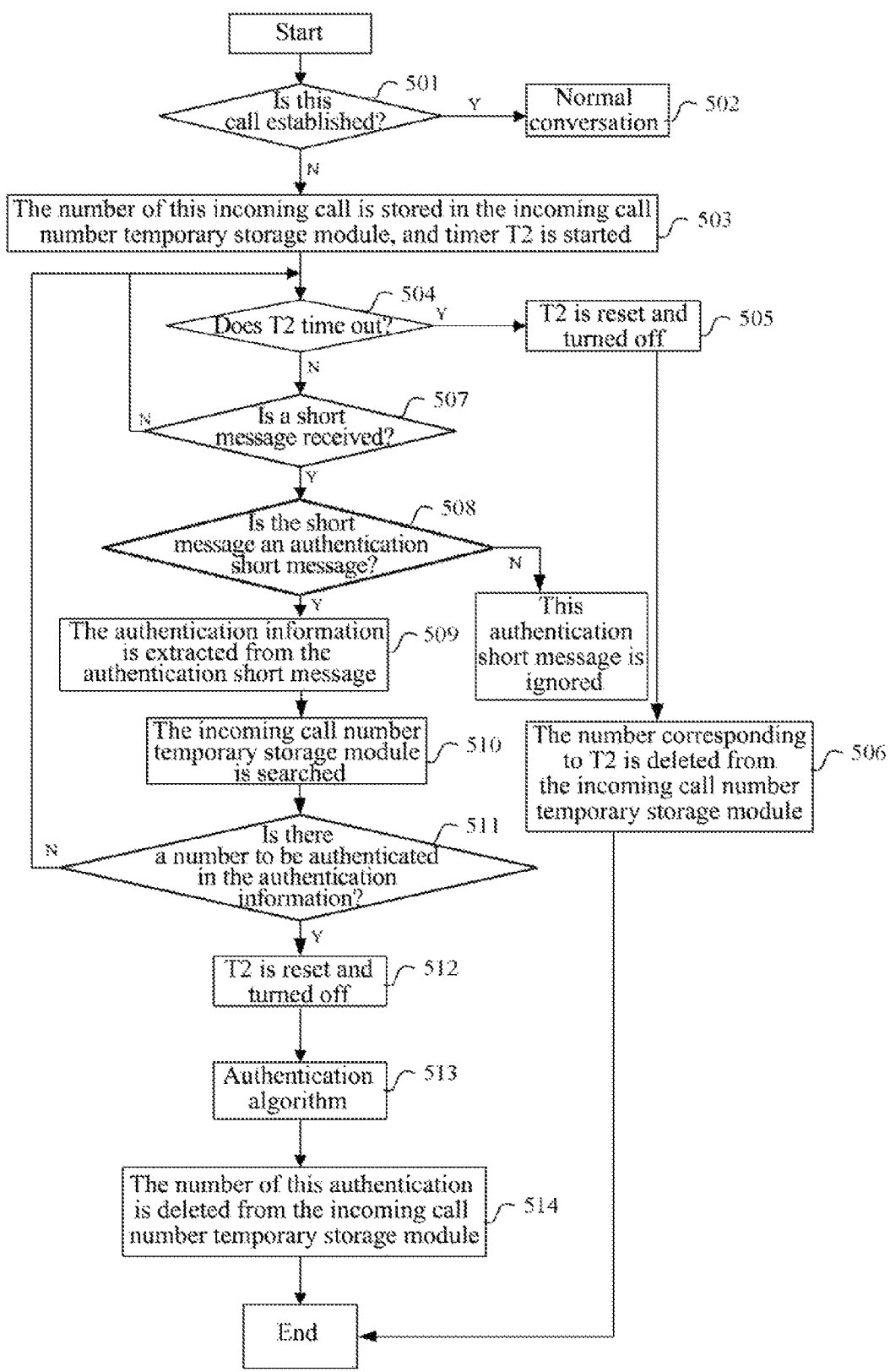
FIG. 5 is a flowchart of detecting a missed call at the terminal side according to an example of the present invention.

Referring to FIG. 5, the flow of the terminal side detecting a missed call comprises the following specific steps.

In step 501, whether this call is established is judged, and if yes, step 502 is executed, otherwise step 503 is executed.

In step 502, the two parties communicate normally, and the flow ends.

In step 503, the called terminal, at the mean time of being hung up by the network side, starts a timer T2 (T2 generally needs to be larger than T1 in view of network delay, for example T2 is set to be one minute), and stores the number of the calling terminal into the incoming call number temporary storage module.

Since there may be another call coming when the called terminal is waiting for the authentication information of the last call, the incoming call number temporary storage module has to be capable of storing several (e.g., three) groups of numbers, and each group of number should have a corresponding timer (for example, T21, T22, T23). FIG. 5 only provides a case where there is one group of numbers, and the cases with multiple groups are similar and thus will not be described here to avoid redundancy.

In step 504, whether T2 times out is judged, and if yes, step 505 is executed, otherwise, step 507 is executed.

In step 505, T2 is reset and turned off.

In step 506, the number corresponding to T2 is deleted from the incoming call number temporary storage module; the process ends.

In step 507, whether the called terminal receives a short message is judged, and if yes step 508 is executed, otherwise, turning to step 504.

In step 508, whether the short message is an authentication short message is judged, and if yes, step 509 is executed, otherwise this authentication short message is ignored.

In step 509, the called terminal extracts the authentication information therein.

In step 510, the incoming call number temporary storage module is searched.

In step 511, whether there is a number to be authenticated in the authentication information is judged, and if yes step 512 is executed, otherwise turning to step 504.

In step 512, if there is, it is indicated that the authentication short message is valid, T2 is reset and turned off.

In step 513, a preset authentication algorithm is invoked for authentication.

In step 514, after authentication, the number of this authentication is deleted from the incoming call number temporary storage module.

Figure 6:
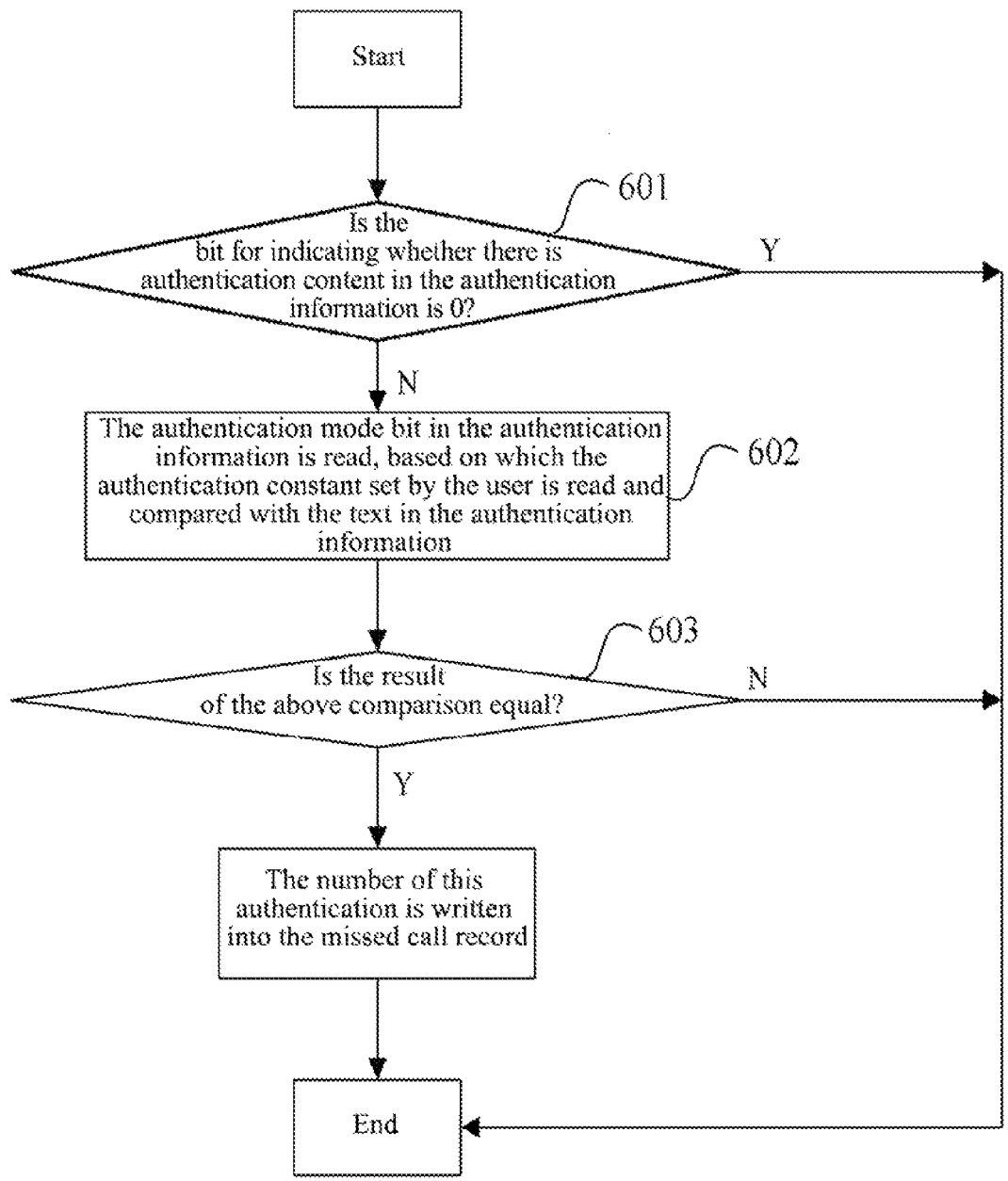
FIG. 6 is a flowchart of the authentication algorithm according to an example of the present invention.

Referring to FIG. 6, the flow of authenticating with the authentication algorithm comprises the following specific steps.

In step 601, whether the authentication content is complete is detected, and mainly whether the bit for indicating whether there is authentication content in the authentication information is 0 is detected, if yes, this authentication is not passed, and no processing is implemented, otherwise, step 602 is executed.

In step 602, authentication is implemented: the authentication mode bit in the authentication information is read, based on which the authentication constant set by the user is read and compared with the text in the authentication information.

In step 603, whether the result of the above comparison is equal is judged, if yes, this authentication is passed and the number of this authentication is written into the missed call record, otherwise, this authentication is not passed, and no processing is implemented.

In conclusion, with the example of the present invention, only the valid missed call can be stored into the missed call record so as to enable the user of the terminal to avoid invalid missed calls effectively, thereby meeting people's requirement on normal communication and contact.

It can be understood by the ordinary person skilled in the field that some or all steps in the abovementioned method can be fulfilled by instructing the relevant hardware components with a program, and said program is stored in a computer readable storage medium such as read only memory, magnetic disk or optical disk and so on. Optionally, some or all steps in the abovementioned example can be implemented with one or more integrated circuits. Correspondingly, each module/unit in the abovementioned example can be implemented in the form of hardware or in the form of software function module. The present invention is not limited to the combination of any specific form of hardware and software.

It needs to point out that those skilled in the art can make corresponding equivalent modifications or substitutions according to the technical scheme and concept of the present invention, and all these modifications or substitutions, however, shall fall within the protection scope of the attached claims of the present invention.

INDUSTRIAL APPLICABILITY

According to the method and device for detecting whether a missed call is valid disclosed in the present invention, only valid missed calls are stored into the missed call record so as to enable the user at the terminal to avoid invalid missed calls effectively, thereby meeting people's requirement on normal communication and contact.

What is claimed is:

1. A mobile terminal, comprising:
an incoming call number temporary storage module, which is configured to store an incoming call number to be authenticated;
a receiving module, which is configured to receive a short message sent from a network side;
an authentication short message identifying module, which is configured to identify an authentication short message among received short messages, validating said the authentication short message and send out the authentication information in the said authentication short message when the said authentication short message is validated;
wherein, the authentication short message identifying module is configured to extract the authentication information from the authentication short message, search numbers to be authenticated stored in the incoming call number temporary storage module using a number to be authenticated in the authentication information, and determine that the authentication short message is valid if an identical number to be authenticated is searched out;
an authenticating module, which is configured to receive the said authentication information, and authenticate the corresponding incoming call number in the incoming call number temporary storage module; and
a missed call writing module, which is configured to write an incoming call number that is passed the authentication into a missed call record=;
a timing module, which is triggered when a number to be authenticated is stored into the incoming call number temporary storage module and is configured to determine a valid time for receiving the authentication short message.

2. A method for detecting whether a missed call is valid, comprising: when a call is not successfully established, a network side prompting a caller to enter authentication information and sending the authentication information entered by the caller to a called terminal side in a form of a short message;
wherein, after the network side prompts the caller to enter the authentication information, the method further comprises: starting a first timer, and determining a valid time when the caller enters the authentication information;
the called terminal side receiving and identifying an authentication short message, judging whether the authentication short message is valid, and authenticating a corresponding incoming call number to be authenticated in a cache by using the authentication information when the authentication short message is judged to be valid;
wherein, said step of judging whether the authentication short message is valid comprises: extracting the authentication information from the authentication short message;
searching cached numbers to be authenticated by using a number to be authenticated in the authentication information; and
determining that the authentication short message is valid if an identical number to be authenticated is searched out; and
the called terminal side writing the incoming call number passing the authentication into a missed call record.

3. The method for detecting whether a missed call is valid according to claim 2, further comprising: the called terminal side starting a second timer after the incoming call number to be authenticated is cached, and determining a valid time for receiving the authentication short message.

4. The method for detecting whether a missed call is valid according to claim 2, wherein, after the called terminal side writes the incoming call number passing the authentication into a missed call record, the method further comprises:
the called terminal side deleting the incoming call number from the cache; and/or,
the called terminal side deleting an incoming call number not passing the authentication from the cache.

* * * * *